Patented Aug. 14, 1923.

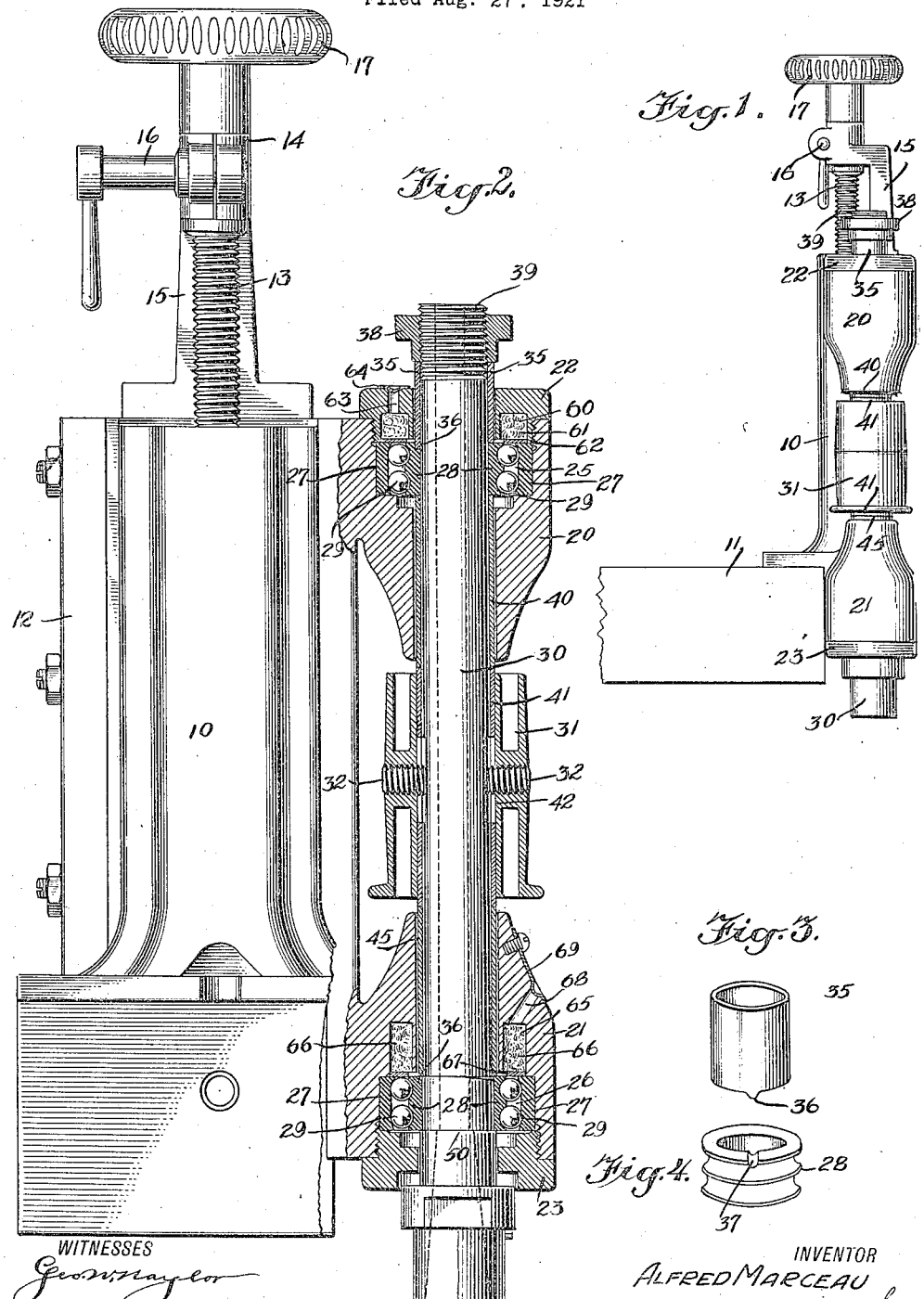

1,465,226

UNITED STATES PATENT OFFICE.

ALFRED MARCEAU, OF BROOKLYN, NEW YORK.

ROUTING HEAD.

Application filed August 27, 1921. Serial No. 496,013.

*To all whom it may concern:*

Be it known that I, ALFRED MARCEAU, a citizen of the United States, and a resident of the city of New York, borough of Brooklyn, in the county of Kings and State of New York, have invented a new and Improved Routing Head, of which the following is a full, clear, and exact description.

The object of the invention is to provide a new and improved routing head for photoengraving work and arranged to insure free running of the tool-carrying spindle and reduce wear to a minimum thus prolonging the life of the running parts.

Another object is to allow convenient and quick assembling and disassembling of the running parts.

With these and other objects in view, the invention consists of certain novel features of construction as hereinafter shown and described and then specifically pointed out in the claims.

A practical embodiment of the invention is represented in the accompanying drawings in which similar characters of reference indicate corresponding parts in all the views.

Figure 1 is a side elevation of the improved routing head mounted on the usual movable arm;

Figure 2 is an enlarged rear elevation of the routing head with parts shown in section;

Figure 3 is a perspective view of one of the sleeves; and

Figure 4 is a similar view of one of the ball race members.

The frame 10 of the routing head is attached to the free end of the usual swing arm 11 and on the frame 10 the head 12 is mounted to slide up and down by the use of a screw rod 13 screwing in the head and mounted to turn in a suitable bearing 14 arranged on a bracket 15 attached to the top of the head 12. The bearing 14 is preferably split and a clamping screw 16 engages the split parts to draw the latter together whenever it is desired to clamp the screw rod 13 in place after the desired up or down adjusting movement has been given to the head 12. The upper end of the screw rod 13 is provided with a suitable handle 17 for conveniently turning the screw rod 13 after the same has been unclamped by the clamping screw 16.

On the head 12 are cast or secured upper and lower spindle supports 20 and 21, of which the upper spindle support 20 is provided on the top with a screw cap 22 and a similar screw cap 23 screws in the lower end of the lower spindle support 21. Within the spindle supports 20 and 21 are arranged ball bearings 25 and 26 having fixed race members 27 and rotatable race members 28 with balls 29 interposed between the said race members. Through the rotatable ball race members 28 extends loosely a spindle 30 adapted to support at its lower end the usual routing tool. On the spindle 30 intermediate the spindle supports 20 and 21 a driving pulley 31 is secured by screws 32 or other fastening devices, and this pulley 31 is connected by a belt with other machinery for imparting a rotary motion to the spindle 30.

In order to rotate the rotatable ball race members 28 with the spindle 30 the following arrangement is made: On the upper end of the spindle 30 is mounted loosely a top spindle sleeve 35 extending through the cap 22 and provided at its lower end with a lug 36 engaging a recess 37 formed in the top of the rotatable ball race member 28 of the upper ball bearing 25. The top of the sleeve 35 is engaged by a nut 38 screwing on the upper threaded end of the spindle 30 and hence when the latter is rotated a rotary motion is transmitted to the rotatable ball race member 28 by the nut 38 and the sleeve 35. The under side of the ball race member 28 of the upper ball bearing 25 engages the top of a spindle sleeve 40 extending loosely through the upper spindle support 20 and resting on the top of a spindle sleeve 41 extending through the pulley 31 and having slots 42 for the passage of the attaching screw 32 previously mentioned. The lower end of the spindle sleeve 41 rests on top of a lower spindle sleeve 45 held loosely in the upper portion of the lower spindle support 21. This sleeve 45 is interlocked at its lower end with the rotatable ball race member 28 of the lower ball bearing 26 by the use of a lug 36 and a recess 37, the same as above described in reference to the top sleeve 35 and the rotatable ball race member 28 of the upper ball bearing 25. The lower end of the ball race member 28 of the lower ball bearing 26 rests on an annular shoulder 50 formed on the spindle 30, and the fixed ball race member 27 of the lower ball bearing 26 rests on the cap 23. It will be noticed that by the use of the interposed sleeves 40, 41 and 45, the rotary motion given to the ball race member 28 of the upper ball bearing 25 is transmitted to the ball race member 28 of the lower ball bearing 26. It will also be noticed that by the arrangement described the spindle supports 20 and 21 are not in the least affected as far as wear is concerned by the rotating spindle 30. It will further be noticed that on removing the nut 38 and the cap 22 the sleeve 35 and the upper ball bearing 25 can be readily removed for repairs or other purposes and the spindle 30 can readily be withdrawn after loosening the screws 32 to permit of readily removing the lower cap 33, the lower ball bearing 26 and the sleeve 45 for repairs or other purposes. After the spindle 30 has been removed the pulley 31 with its sleeve 41 can be removed and likewise the sleeve 40. In a like manner the several parts can be readily assembled and fastened together to insure a free running of the spindle and to reduce wear of the running parts to a minimum thus prolonging the life of the routing head.

In order to insure proper lubrication of the ball bearings 25 and 26 the following arrangement is made: In the under side of the cap 22 is formed an oil well 60 filled with a wick 61 or similar material, and in the open bottom of the oil well 60 is arranged a ring 62 resting on the fixed ball race member 27 of the upper ball bearing 25. The ring 62 extends in close proximity to the rotatable ball race member 28 to allow oil from the oil well 60 to pass through the balls 29 and into the space between the ball race members 27 and 28 to lubricate the same. A filling hole 63 is formed in the cap 22 and leads to the oil well 60, and this filling hole 63 is normally closed by a suitable closure 64. A similar oil well 65 filled with a wick 66 is formed in the upper portion of the lower spindle support 21 and the open bottom of this oil well is provided with a ring 67 similar to the ring 62 and for the same purpose. A filling hole 68 is formed in the spindle support 21 and leads to the top of the oil well 65 and this filling hole 68 is normally closed by a suitable closure 69 the same as the closure 64.

It will be noticed that in both cases the lubricating oil lubricates the ball bearings 25 and 26 by gravity and as the oil wells can contain an ample supply of oil it is evident that the ball bearings are well supplied with oil for a considerable length of time.

Having thus described my invention, I claim as new and desire to secure by Letters Patent:

1. In a routing head, spaced upper and lower spindle supports, ball bearings mounted in said supports and having fixed and rotatable ball-race members, a spindle extending into the supports and through the bearings, a plurality of sleeve elements for the spindle auxiliary to the inner race members and also extending into the supports, said inner race members and sleeve elements abutting endwise one against another and carrying co-acting projections and recesses at their ends, the support for one of the ball bearings constituting a stop for one end of the stack of sleeve elements and inner race members, and releasable means for compressing the stack against said stop to maintain all members of the stack positively interlocked and locked on the spindle, the means last mentioned comprising a nut threaded on one end of the spindle beyond said stack.

2. In a routing head, spaced upper and lower spindle supports, ball bearings mounted in the said supports and having fixed and rotatable ball race members, a spindle extending through the ball bearings, a pulley attached to the said spindle intermediate the said spindle supports, a top spindle sleeve on the upper end of the spindle and engaging the rotatable ball race member of the upper ball bearing, a nut screwing on the upper end of the spindle and abutting aginst the upper end of the said upper sleeve, a spindle sleeve in the pulley and engaging the spindle, an intermediate spindle sleeve between the bottom of the upper ball bearing and the said pulley sleeve, and a spindle sleeve engaging the rotatable ball race member of the lower ball bearing and interposed between the latter and the said pulley sleeve.

ALFRED MARCEAU.